United States Patent [19]
Koenig

[11] 3,746,194
[45] July 17, 1973

[54] BOAT ELEVATING AND SUPPORTING MECHANISM

[76] Inventor: John O. Koenig, 1841 S. Oakmont Drive, Bountiful, Utah 84010

[22] Filed: June 14, 1971

[21] Appl. No.: 152,564

[52] U.S. Cl. .................................. 214/450, 214/77
[51] Int. Cl. ............................................. B60r 9/00
[58] Field of Search ..................... 214/450, 77, 130; 296/57 A; 267/73

[56] References Cited
UNITED STATES PATENTS

| | | | |
|---|---|---|---|
| 3,357,578 | 12/1967 | Koenig | 214/450 |
| 2,982,431 | 5/1961 | Moody | 214/77 R |
| 3,009,732 | 11/1961 | Brown | 296/57 A |
| 2,746,620 | 5/1956 | Lindle | 214/77 R |

Primary Examiner—Robert G. Sheridan
Assistant Examiner—John Mannix
Attorney—B. Deon Criddle

[57] ABSTRACT

A spring biased, pivoted support mechanism adapted especially for use in elevating boats to be carried on pickup mounted camper coaches. A support arm used with a boat engaging rack is arranged to be lowered to receive a boat and a catch on a spring means of the pivoted support mechanism is released so that the spring means can assist in rotating the support rack and a boat secured thereto upwardly.

6 Claims, 4 Drawing Figures

Patented July 17, 1973

INVENTOR:
JOHN O. KOENIG
BY:
B. Dean Griddle
ATTORNEY

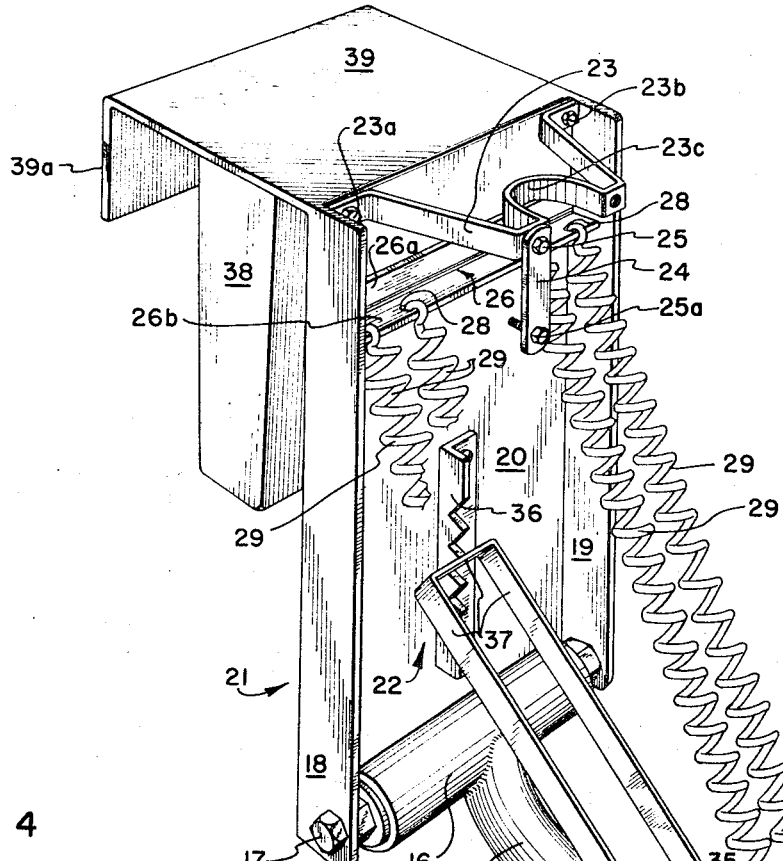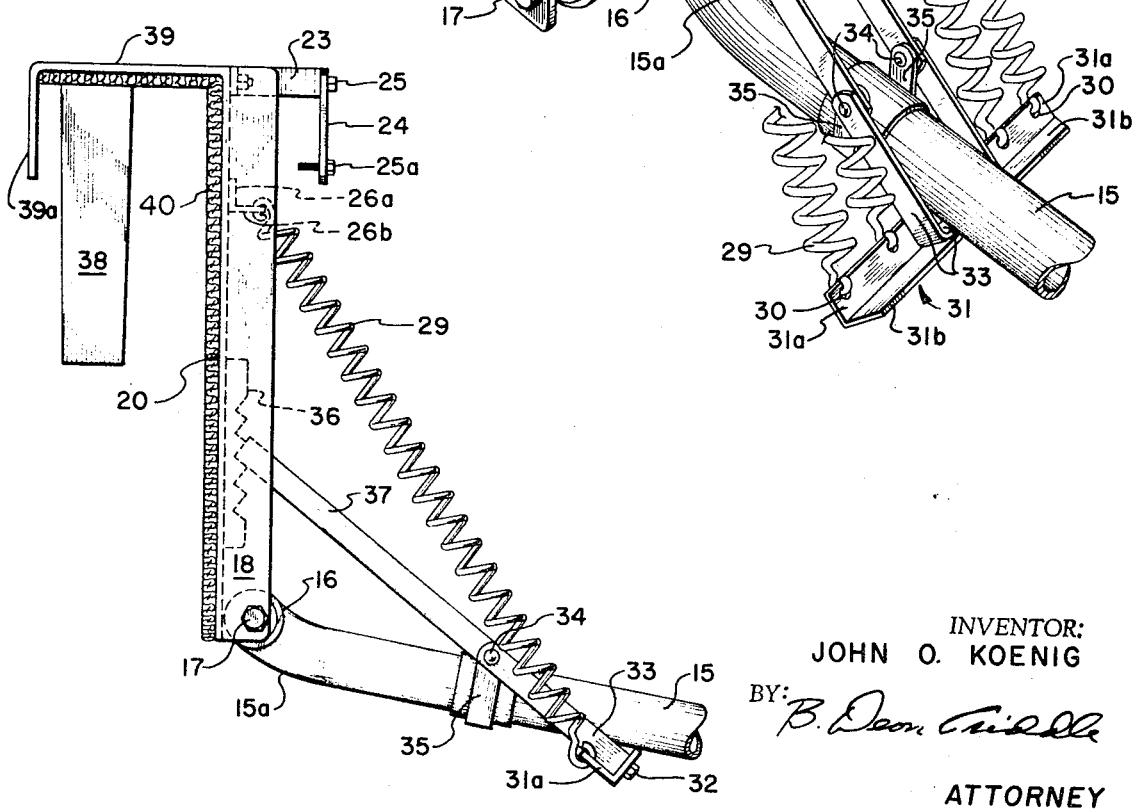

BOAT ELEVATING AND SUPPORTING MECHANISM

BRIEF DESCRIPTION OF THE INVENTION

1. Field of the Invention

This invention relates to devices for elevating boats and the like to the tops of vehicles and for supporting them in the elevated position.

2. Prior Art

In the past, various devices have been developed for use in lifting boats and like items onto the top of a vehicle, for supporting them above the vehicle, and for lowering them back to ground. My U.S. Pat. No. 3,357,578, for example, discloses a lifting device especially adapted for use with camper coaches that are mounted on a pickup truck. The present invention constitutes an improved support means of the type disclosed in my aforementioned patent. In this invention, a spring biasing means is provided to assist in elevating a support arm carrying a boat, or the like, whereby the load can be more easily elevated to a location above a vehicle.

SUMMARY OF THE INVENTION

Principal objects of the present invention are to provide means to assist in elevating loads, such as canoes and small boats from ground level to the tops of camper bodies and the like, and to assist in lowering such a load to the ground.

Other objects are to provide such an assist means that is adaptable for use with many types of pickup truck, camper body and boat combinations and that can be readily attached for use.

Principal features of the present invention include a support arm having one end arranged to be pivotally mounted alongside a vehicle on a mounting frame. The arm carries a rack on its free end and the arm can be rotated to a lowered position such that a boat or similar load can be fixed to the rack. Spring means, which is loaded or stretched when the support arm is lowered and which unloads or recoils when the support arm is raised assists an operator in elevating the load carrying support arm. The spring means is pivotally connected to the support and rotates with it as the arm is lowered and raised. The pivot connections employed between the spring means and the arm allowing the spring means to be moved between an outwardly projecting actuation position and a position close to the bracket and the arm, when the arm is fully raised, so that neither the spring means or the arm objectionably project.

Another feature is the releasable locking means with which the support arm is retained in selected position proximate to the ground while the rack is loaded with a boat or the like. The locking means consists of a brace that is pivotally connected to the support arm and that is adapted to engage any one of a plurality of detent notches arranged on the mounting frame.

Additional objects and features of the invention will become apparent from the following detailed description and drawings, disclosing what is presently contemplated as being the best modes of the invention.

THE DRAWINGS

FIG. 1 is a perspective view of a vehicle having mechanism of the invention mounted alongside and the support arm that carries a boat shown raised, and with the lowered position of the support arm shown in phantom;

FIG. 2, an enlarged, fragmentary side elevation view taken within the line 2—2 of FIG. 1 and showing the support arm and support arm mounting frame;

FIG. 3, a perspective view of the support arm and support arm mounting frame of FIG. 2, with the support arm lowered to the ground and the spring means loaded; and FIG. 4, a side elevation view of the support arm and support arm mounting in the position of FIG. 3.

DETAILED DESCRIPTION

Figure 1:
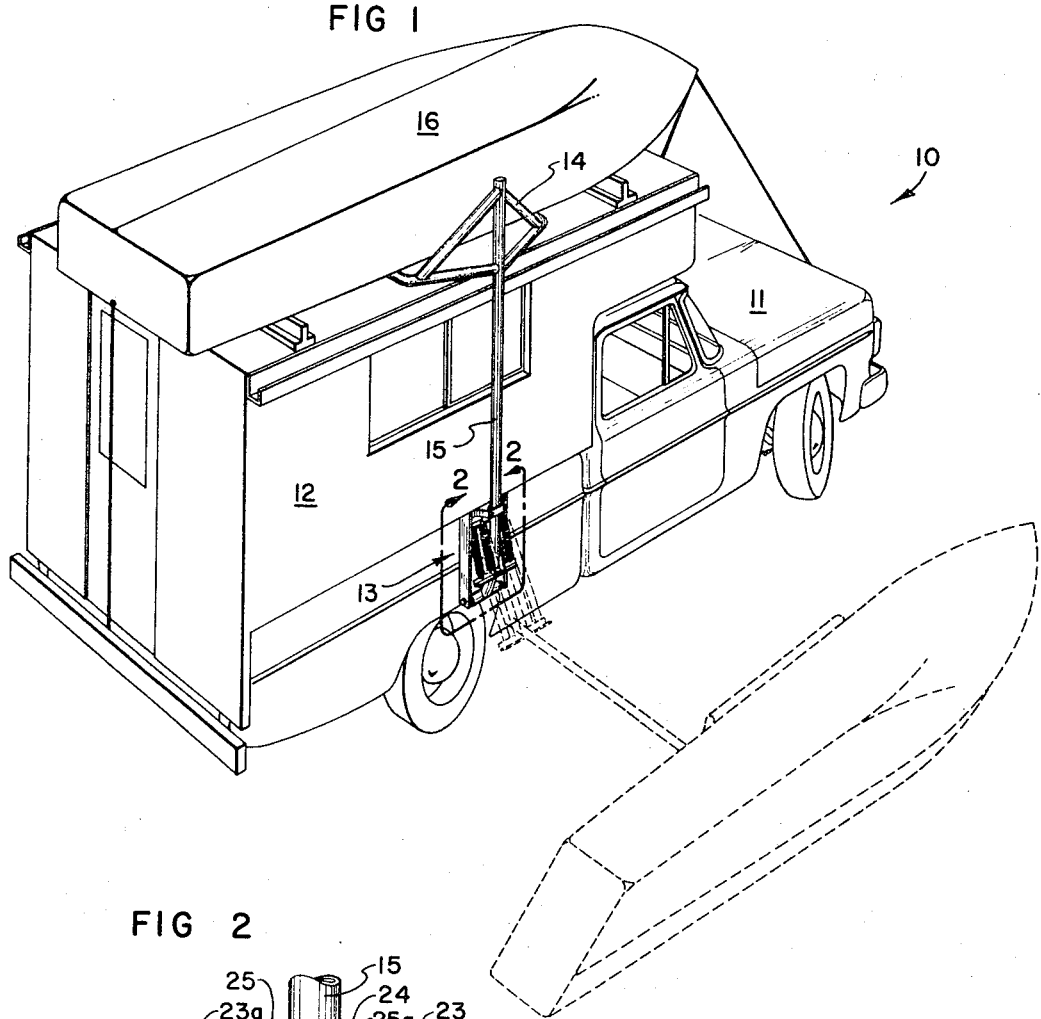
Figure 2:
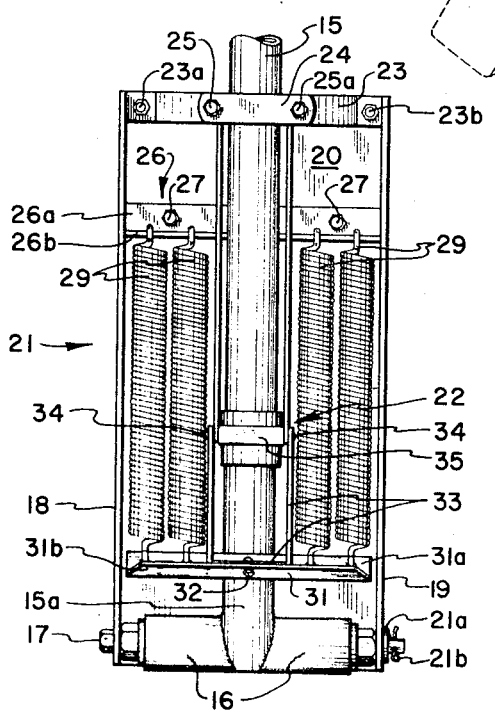

Referring now to the drawings:

In the illustrated preferred embodiment, a vehicle 10, here shown as a pickup truck 11 with a camper body 12 mounted on the bed thereof, has the boat elevating and supporting mechanism, shown generally at 13, mounted on one side. A rack 14 which may be of the type shown in my U.S. Pat. No. 3,357,578, is cantilevered from the free end of a support arm 15, and a boat 16 is secured to the rack 14 in the manner disclosed in my aforementioned patent.

The support arm 15 is here shown as being formed from round pipe, but it should be apparent that other materials could be used. Support arm 15 is curved at its lower end 15a and terminates at transversely extending trunnions 16. The trunnions are journaled on a bolt 17 extending between flanges 18 and 19 that project at opposite sides from a plate 20 of the mounting frame shown generally at 21. A washer 21a and cotter key 21b through the end of the bolt hold the bolt in place. The bend 15a allows the support arm to be raised such that the upper end thereof will extend close to the top of the vehicle with which it is used and also allows the arm to clear the latch mechanism, shown generally at 22.

A bracket 23 is mounted by bolts 23a and 23b to the top of plate 20. The bracket 23 has a saddle 23c formed therein in which support arm 15 is positioned when the support arm is in its full upright position. A clamp 24 is pivotally connected at 25 to one side of bracket 23 and the clamp can be rotated to extend across saddle 23c when the support arm 15 is positioned therein. A threaded bolt 25a can then be inserted through clamp 24 and into bracket 23, to hold it in place preventing lowering of the support arm.

A piece of angle iron 26 has one leg 26a secured to plate 20 as by bolts 27 and has holes 28 in the other leg 26b to which ends of coil springs 29 are attached. The other ends of the springs 29, four of which are shown, are connected through holes 30 in a leg 31a of a spring connector means comprising another piece of angle iron 31. The other leg 31b of angle iron 31 is fixed, as by bolt 32 to the web of a U-shaped collar 33. The legs of collar 33 are pivotally connected, as by bolts 34, to ears 35 that are welded to and that project from opposite sides of the support arm.

The springs 29 are made long enough that they do not pull the angle iron 31 against the arm 15 until the arm has been partially rotated from its upright position (FIG. 1) towards its lowered position. After sufficient rotation has been completed however the arm 15 engages the angle iron 31 and continued rotation of the arm will pivot the collar 33 and the angle iron around the bolts 34, while stretching the springs 29. The springs 29 thus resist lowering of the arm 15 and the load carried thereby and keep the load from rapidly dropping. Conversely, the springs assist an operator to raise arm 15 and a load thereon to the point where the springs are fully retracted. Thereafter, it is a simple matter for the operator to push the arm 15 to its fully raised position thereby moving the cantilevered load over the camper body.

If the arm 15 is rotated to a lowered position and there is no load thereon, the springs 29 naturally tend to raise the arm. The latch assembly, shown generally at 22 is provided to hold the arm in a selected lowered position, against the bias of the springs. Thus, the arm can be held steady while a load is placed on or removed from the end thereof.

The latch assembly comprises a toothed rack 36 fixed to plate 20 and a yoke 37, the arms of which are pivotally connected to ears 35 by bolts 34. The yoke length is such that when the arm 15 is pivoted to a lowered position the web of the yoke will engage a tooth on the rack 36. The springs 29, biasing the arm 15 upward, then wedge the yoke 37 between the arm and the toothed rack to hold the arm in a lowered position. To release the arm it is only necessary to further the arm and to pivot the yoke about bolts 34 until it will not engage a tooth on the rack 36 as the arm pivots upwardly.

The boat elevating and support mechanism of the invention can be attached to the side of any truck or other vehicle having a camper body mounted thereon and can be used to elevate canoes, boats or other loads to the top of the camper body for storage. The mechanism can be attached to the vehicle body by use of bolts through plate 20 and the body, or by use of various other types of clamping mechanisms, not shown. Conveniently, however, for use with pickup trucks and the like having properly placed, rectangularly shaped stake pockets in the sides of the truck bed, a post 38 of rectangular cross-section, depends from an extension plate 39 fixed to the top of plate 20. The extension plate 39 has a lip 39a which extends perpendicularly downward from plate 39 to contact the inner surface of the pickup truck side. The post 38 extends down into the stake pocket to hold the plate 20 securely against the side of the vehicle and the matching non-circular configurations of the stake pocket and post prevent any twisting of the mechanism. With this arrangement, no bolts or screws extend down into the top of the side walls of the truck bed and no such bolts or screws project upwardly to prevent proper positioning of the camper body.

Although a preferred form of my invention has been herein disclosed, it is to be understood that the present disclosure is by way of example and that variations are possible without departing from the subject matter coming within the scope of the following claims, which subject matter I regard as my invention.

I claim:

1. An elevating and supporting mechanism comprising a support plate;

a support arm having an end journaled with respect to said support plate;

means on the other end of the support arm for affixing a load thereto;

a collar having ends pivotally connected to the support arm, intermediate the ends of the arm and a spring connector means adapted to be pivoted into and out of engagement with the support arm;

spring means interconnecting the support plate and the spring connector means such that a portion of the support arm is between the support plate and a portion of the spring connector means whereby the spring means biases the collar to move the support arm to an upright raised position; and means for releasably locking the support arm in one of a plurality of selected lowered positions and for maintaining the arm locked in the said selected position while a load is attached to or removed from the said support arm.

2. A support structure and elevating means as in claim 1, further including an attachment means on the support plate to releasably hold the support arm intermedaite its length whereby the support arm is maintained in a generally upright position.

3. A support structure and elevating means as in claim 2, wherein the attachment means comprises a bracket fixed to support plate and having a saddle formed therein to receive the support arm;

a strap; and means for securing the strap in place extending across the saddle when the support arm is positioned therein.

4. A support structure and elevating means as in claim 1, wherein the spring means comprises a plurality of springs each having one end fixed to the support plate and their other end attached to the collar.

5. A support structure and elevating means as in claim 1, wherein the releasable locking means consists of a yoke having legs pivotally connected to opposite sides of the support arm; and a toothed rack of teeth mounted on the support plate, whereby a web of the yoke will engage a tooth on the rack when the support arm is pivoted to a selected lower position, whereby the yoke is wedged between the rack and the support arm to hold the support arm in the selected lower position.

6. An elevating and supporting mechanism comprising a support plate;

a support arm having an end journaled with respect to said support plate;

means on the other end of the support arm for affixing a load thereto;

a collar pivotally connected to the support arm, intermediate the ends of the arm;

spring means interconnecting the support plate and the collar such that the support arm is between the support plate and a portion of the collar whereby the spring means biases the collar to move the support arm to an upright raised position; and means including an extension extending perpendicularly out from the support plate, a post extending downwardly from the extension, and said post extending essentially parallel to the support plate having dimensions such that it fits into a stake pocket formed in the top edge of the wall of a truck body for attaching the support plate to the side of a vehicle.

* * * * *